G. W. TATE.
Thrashing-Machine.
No. 197,909.                    Patented Dec. 4, 1877.
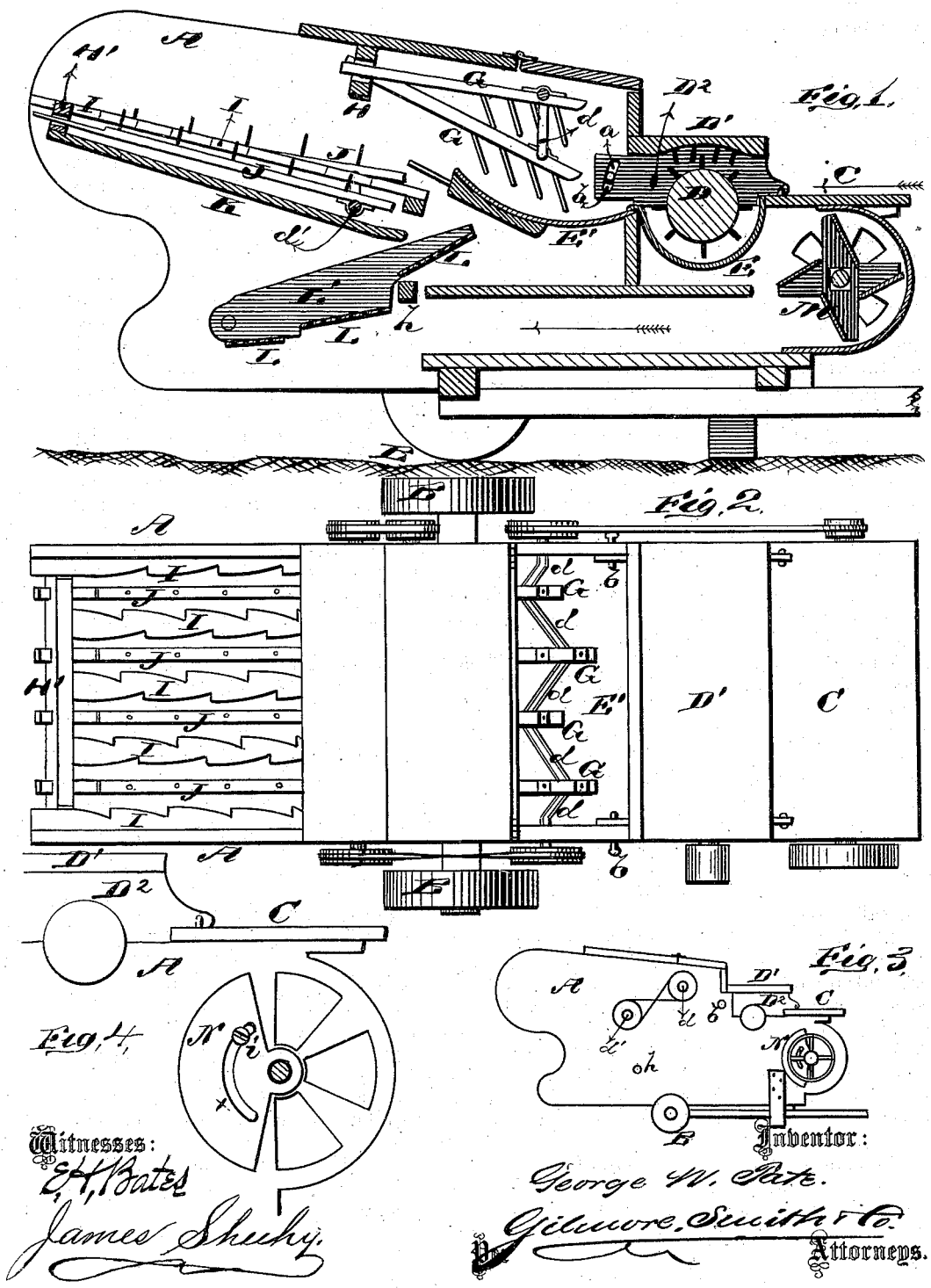

UNITED STATES PATENT OFFICE.

GEORGE W. TATE, OF MEBANESVILLE, NORTH CAROLINA.

IMPROVEMENT IN THRASHING-MACHINES.

Specification forming part of Letters Patent No. 197,909, dated December 4, 1877; application filed September 22, 1877.

*To all whom it may concern:*

Be it known that I, GEORGE W. TATE, of Mebanesville, in the county of Alamance and State of North Carolina, have invented a new and valuable Improvement in Thrashing-Machines; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal vertical section of my thrashing-machine. Fig. 2 is a plan view. Fig. 3 is a side view, and Fig. 4 is a detail view thereof.

The nature of my invention consists in the construction and arrangement of the parts of a thrashing-machine, as will be hereinafter more fully set forth.

The annexed drawings, to which reference is made, fully illustrate my invention.

A represents the frame or housing of my thrashing-machine, mounted upon wheels B B, so that it can be easily moved from place to place when required.

C is the feed-table, over which the straw and grain are fed to the thrashing-cylinder D, such straw and grain passing over said cylinder, and not underneath the same. Below the thrashing-cylinder D is a smooth concave, E, forming the curved inclined forward extension E' in front of the cylinder, over which the straw and grain are carried by the first rake. Above and around the top of the cylinder is a toothed or spiked concave, D¹, provided at each end with a cast-metal plate or end piece, D², hinged to the feed-table C, the whole forming the cap or top casing of the cylinder.

In the rear end of each plate D² is a slot, *a*, for the passage of a bolt, *b*, to fasten the same to the frame A. The slots *a* admit of the concave D¹ being adjusted as required with relation to the cylinder, and by removing the bolts *b* the concave may be thrown entirely back. The feed-table in this case serves as a support for the concave.

The first rake consists of a series of bars, G G, provided on their under sides with downwardly-projecting teeth. The upper ends of these toothed bars are held and move in a stationary guide, H, while their lower rear ends are placed upon and operated by a multiple crank-shaft, *d*, as shown. This rake carries the straw and grain over the incline E' onto a series of inclined notched bars, I I, between which the grain falls downward onto an inclined board, K, while the straw is discharged at the end of the machine by the second rake, composed of a series of bars, J J, provided on their upper sides with upwardly-projecting teeth. These toothed bars J J are operated at their lower rear ends by a multiple crank-shaft, *d'*, while their upper front ends are held and move in a stationary guide-bar, H'.

From the inclined board K the grain falls onto a series of sieves, L, arranged in a shoe, L', which is pivoted at one end, and obtains a shaking motion by resting upon a rotating square shaft, *h*.

The grain, as it passes over these sieves, is cleaned from all chaff, &c., by a blast of air passing over the same from a fan, M, which fan is located below the feed-table, in rear of the cylinder.

At each end of the fan-case is a pivoted cut-off, N, for regulating the supply of air to the fan, and thus regulating the blast. This cut-off is in segmental form, and adjusted and held in any position desired by means of set-screws *i*, passing through slots *x*, as shown.

The various parts of the machine are operated by means of belts and pulleys, substantially as shown in the drawing.

What I claim as new, and desire to secure by Letters Patent, is—

In an overshot thrashing-machine, the combination of the feed-table C, cylinder D, toothed concave D¹, with end plates D², hinged to the feed-table, and forming the cap or upper casing of the cylinder, and adjustably fastened to the frame by bolts *b*, passing through slots *a* in the plates, substantially as and for the purposes set forth.

In testimony that I claim the above I have hereunto subscribed my name in the presence of two witnesses.

GEO. W. TATE.

Witnesses:
SAML. K. SCOTT,
W. W. LASLEY.